United States Patent
Hu et al.

(10) Patent No.: US 11,891,063 B2
(45) Date of Patent: Feb. 6, 2024

(54) SAFE FOLLOWING DISTANCE ESTIMATION SYSTEM AND ESTIMATION METHOD THEREOF

(71) Applicant: Industrial Technology Research Institute, Hsinchu (TW)

(72) Inventors: Chen-Hui Hu, Taichung (TW); Hsiu-Wei Hsu, Taipei (TW); Kun-Lung Ku, Changhua County (TW); Chiao-Tung Chan, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 91 days.

(21) Appl. No.: 17/563,085

(22) Filed: Dec. 28, 2021

(65) Prior Publication Data

US 2023/0159031 A1 May 25, 2023

(30) Foreign Application Priority Data

Nov. 19, 2021 (TW) ................................ 110143172

(51) Int. Cl.
*B60W 30/16* (2020.01)
*B60W 40/04* (2006.01)
(Continued)

(52) U.S. Cl.
CPC .......... *B60W 30/16* (2013.01); *B60W 30/143* (2013.01); *B60W 40/04* (2013.01);
(Continued)

(58) Field of Classification Search
CPC .... B60W 30/16; B60W 30/143; B60W 40/04; B60W 40/068; B60W 50/14;
(Continued)

(56) References Cited

U.S. PATENT DOCUMENTS 6,671,595 B2 * 12/2003 Lu ........................ B60T 8/17551
180/197
6,915,193 B2 * 7/2005 Lu ........................... B60T 8/172
701/41
(Continued)

FOREIGN PATENT DOCUMENTS

CN 103646298 3/2014
CN 105818813 8/2016
(Continued)

OTHER PUBLICATIONS

Machine translation of JP 2002-79850 A, downloaded from IP.com Jun. 14, 2023 (Year: 2023).*
(Continued)

*Primary Examiner* — Peter D Nolan
*Assistant Examiner* — Tanya C Sienko
(74) *Attorney, Agent, or Firm* — JCIPRNET

(57) ABSTRACT

A safe following distance estimation system and an estimation method thereof are provided. The safe following distance estimation system adapted for an autonomous vehicle includes a sensor and a processor. The sensor senses an adjacent vehicle to generate first sensing data, and senses the autonomous vehicle to generate second sensing data. The processor estimates a first friction parameter between wheels of the adjacent vehicle and a pavement according to pavement material data, and estimates a second friction parameter between wheels of the autonomous vehicle and the pavement according to the second sensing data. The processor calculates a safe following distance between the autonomous vehicle and the adjacent vehicle according to the first sensing data, the second sensing data, the first friction parameter, the second friction parameter.

12 Claims, 4 Drawing Sheets

(51) Int. Cl.
*B60W 40/068* (2012.01)
*B60W 50/14* (2020.01)
*B60W 60/00* (2020.01)
*B60W 30/14* (2006.01)

(52) U.S. Cl.
CPC .......... *B60W 40/068* (2013.01); *B60W 50/14* (2013.01); *B60W 60/0015* (2020.02); *B60W 2050/146* (2013.01); *B60W 2520/14* (2013.01); *B60W 2520/28* (2013.01); *B60W 2552/40* (2020.02); *B60W 2554/4042* (2020.02); *B60W 2554/4043* (2020.02); *B60W 2554/801* (2020.02); *B60W 2554/802* (2020.02); *B60W 2556/40* (2020.02)

(58) Field of Classification Search
CPC ....... B60W 60/0015; B60W 2050/146; B60W 2520/14; B60W 2520/28; B60W 2552/40; B60W 2554/4042; B60W 2554/4043; B60W 2554/801; B60W 2554/802; B60W 2556/40

See application file for complete search history.

(56) References Cited

U.S. PATENT DOCUMENTS

| | | | |
|---|---|---|---|
| 7,899,616 | B2 | 3/2011 | Breed |
| 8,660,734 | B2 | 2/2014 | Zhu et al. |
| 10,144,433 | B2 * | 12/2018 | Jonasson ............. B60W 40/068 |
| 10,692,365 | B2 * | 6/2020 | Ran ...................... G08G 1/0968 |
| 10,861,183 | B2 | 12/2020 | Kim et al. |
| 10,967,874 | B2 | 4/2021 | Jonasson et al. |
| 10,970,790 | B2 | 4/2021 | Shalev-Shwartz et al. |
| 2016/0035220 | A1 * | 2/2016 | Paromtchik ........... B60W 50/14 701/117 |
| 2019/0291727 | A1 | 9/2019 | Shalev-Shwartz et al. |
| 2021/0188284 | A1 * | 6/2021 | Hassel ................. B60W 10/20 |
| 2022/0144257 | A1 * | 5/2022 | Maeda ................. B60W 10/20 |
| 2022/0324421 | A1 * | 10/2022 | Giovanardi ........... B60W 40/06 |

FOREIGN PATENT DOCUMENTS

| | | | | |
|---|---|---|---|---|
| CN | 107253482 | | 10/2017 | |
| CN | 107933562 | | 4/2018 | |
| CN | 113119960 | | 7/2021 | |
| JP | 2002079850 | A * | 3/2002 | |
| JP | 2016514317 | | 5/2016 | |
| JP | 2019506324 | | 3/2019 | |
| JP | 2019139441 | | 8/2019 | |
| JP | 2021060935 | | 4/2021 | |
| JP | 2021060935 | A * | 4/2021 | |
| TW | I531499 | | 5/2016 | |

OTHER PUBLICATIONS

Machine translation of JP 2021-060935 A downloaded from Espacenet Jun. 14, 2023 (Year: 2023).*
"Office Action of Taiwan Counterpart Application", dated Aug. 19, 2022, p. 1-p. 3.
"Office Action of Japan Counterpart Application", dated May 9, 2023, p. 1-p. 3.
Shai Shalev-Shwartz et al., "On a Formal Model of Safe and Scalable Self-driving Cars", arXiv:1708.06374v6 [cs.RO], Oct. 27, 2018, pp. 1-37.
Azzedine Boukerche et al., "Automated Vehicle Detection and Classification: Models, Methods, and Techniques", ACM Computing Surveys, vol. 50, No. 5, Article 62, Oct. 2017, pp. 1-39.
Ricardo De Castro et al., "Real-time Estimation of Tire-Road Friction Peak with Optimal Linear Parameterization", IET Control Theory and Applications, Sep. 2012, pp. 1-23.
Akshay Rangesh et al., "No. Blind Spots: Full-Surround Multi-Object Tracking for Autonomous Vehicles Using Cameras and LiDARs", IEEE Transactions on Intelligent Vehicles, vol. 4, No. 4, Dec. 2019, pp. 588-599.
Buyu Li et al., "GS3D: An Efficient 3D Object Detection Framework for Autonomous Driving", 2019 IEEE/CVF Conference on Computer Vision and Pattern Recognition (CVPR), Mar. 2019, pp. 1019-1028.
Alex H. Lang et al., "PointPillars: Fast Encoders for Object Detection from Point Clouds", 2019 IEEE/CVF Conference on Computer Vision and Pattern Recognition (CVPR), May 2019, pp. 12689-12697.
Patrik Jonsson, "Road Condition Discrimination using Weather Data and Camera Images", 2011 14th International IEEE Conference on Intelligent Transportation Systems, Oct. 5-7, 2011, pp. 1616-1621.
Philip Koopman et al., "Autonomous Vehicles Meet the Physical World: RSS, Variability, Uncertainty, and Proving Safety", Computer Safety, Reliability, and Security—38th International Conference, SAFECOMP 2019, Sep. 11-13, 2019, pp. 1-23.

* cited by examiner

SAFE FOLLOWING DISTANCE ESTIMATION SYSTEM AND ESTIMATION METHOD THEREOF

CROSS-REFERENCE TO RELATED APPLICATION

This application claims the priority benefit of Taiwan application serial no. 110143172, filed on Nov. 19, 2021. The entirety of the above-mentioned patent application is hereby incorporated by reference herein and made a part of this specification.

BACKGROUND

Technical Field

The disclosure relates to a safe following distance estimation system and an estimation method thereof, and in particular to a safe following distance estimation system used in an autonomous vehicle and an estimation method thereof.

Description of Related Art

In order to avoid collisions caused by emergency braking, one of the most effective strategies is to maintain a proper safe following distance between an autonomous vehicle and surrounding vehicles and objects during driving. Regarding the safety verification and monitoring of autonomous vehicles, the Electrical and Electronics Engineers Standards Association (IEEE-SA) published a safety specification for autonomous vehicles, IEEE P2846 (Formal Model for Safety Considerations in Automated Vehicle Decision Making). IEEE P2846 includes a responsibility-sensitive safety (RSS) model. The RSS model defines the safety status of autonomous vehicles and provides measurable parameters. The RSS model includes common rules of keeping a certain safe following distance, that is, a distance to avoid collisions under the worst conditions, from the surrounding vehicles in different scenarios, so as to avoid traffic accidents.

However, maintaining an appropriate safe following distance between an autonomous vehicle and surrounding vehicles with different dynamic performance in different traffic environments is a challenge for the development of autonomous vehicle technology. For example, a large truck loaded with cargo may have a larger deceleration, so an autonomous vehicle behind the large truck needs to pull a longer safe following distance. When an autonomous vehicle is driving on a pavement on which there is water or snow, the friction coefficient between wheels and the pavement is lower than that in a condition of a dry pavement, resulting in a significant reduction in the braking ability of the autonomous vehicle. Therefore, the safe following distance needs to be increased. On the other hand, through a proper safe following distance, an excessive distance between a leading vehicle and a following vehicle may be avoided, and the efficiency of a traffic network may be maintained.

SUMMARY

The disclosure provides a safe following distance estimation system and an estimation method thereof, which calculate a safe following distance between an adjacent vehicle and an autonomous vehicle through identifying a dynamic specification of the adjacent vehicle and estimating friction parameters between wheels of the adjacent vehicle and the autonomous vehicle and the pavement.

The embodiment of the disclosure provides a safe following distance estimation system, adapted for an autonomous vehicle. The safe following distance estimation system includes but is not limited to include a sensor and a processor. The sensor senses an adjacent vehicle to generate first sensing data, and senses the autonomous vehicle to generate second sensing data, and the adjacent vehicle is adjacent to the autonomous vehicle. The processor estimates a first friction parameter between wheels of the adjacent vehicle and a pavement according to pavement material data, estimates a second friction parameter between wheels of the autonomous vehicle and the pavement according to the second sensing data, and calculates a safe following distance between the autonomous vehicle and the adjacent vehicle according to the first sensing data, the second sensing data, the first friction parameter, and the second friction parameter.

The embodiment of the disclosure provides a safe following distance estimation method, adapted for an autonomous vehicle. The safe following distance estimation method includes the following. An adjacent vehicle is sensed to generate first sensing data, and the autonomous vehicle is sensed to generate second sensing data, and the adjacent vehicle is adjacent to the autonomous vehicle. A first friction parameter between wheels of the adjacent vehicle and a pavement is estimated according to pavement material data. A second friction parameter between wheels of the autonomous vehicle and the pavement is estimated according to the second sensing data. A safe following distance between the autonomous vehicle and the adjacent vehicle is calculated according to the first sensing data, the second sensing data, the first friction parameter, and the second friction parameter.

To provide a further understanding of the above features and advantages of the disclosure, embodiments accompanied with drawings are described below in details.

DESCRIPTION OF THE EMBODIMENTS

Figure 1:
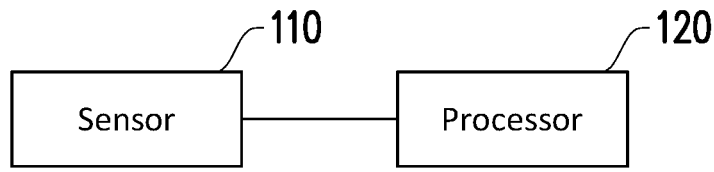
FIG. 1 illustrates a block diagram of a safe following distance estimation system according to an embodiment of the disclosure.

The term "coupling (or connection)" used in the full text of the specification of this application (including the claims) may refer to any direct or indirect connection method. For example, if it is described in the text that a first device is coupled (or connected) to a second device, it should be interpreted as that the first device may be directly connected to the second device, or the first device may be indirectly connected to the second device through other devices or a kind of connection method. In addition, wherever possible, elements/components/steps with the same reference numeral in the drawings and embodiments represent the same or similar parts. Elements/components/steps with the same reference numeral or same term in different embodiments may be referred to for related descriptions.

Figure 2:
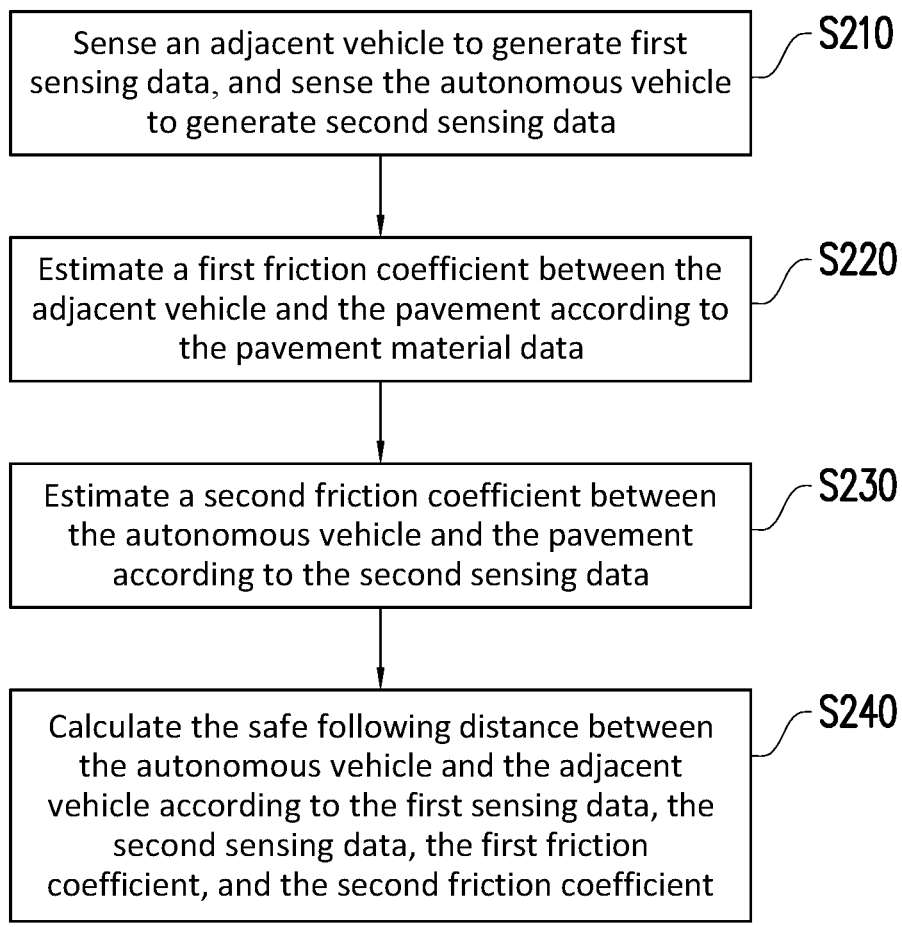
FIG. 2 illustrates a flow chart of a safe following distance estimation method according to an embodiment of the disclosure.

FIG. 1 illustrates a block diagram of a safe following distance estimation system according to an embodiment of the disclosure. FIG. 2 illustrates a flow chart of a safe following distance estimation method according to an embodiment of the disclosure. Referring to FIGS. 1 and 2, a safe following distance estimation system 10 includes but is not limited to include a sensor 110 and a processor 120, and the processor 120 is coupled to the sensor 110. In an embodiment of the present disclosure, the safe following distance estimation system 10 is adapted to an autonomous vehicle, and the safe following distance estimation system 10 may receive a plurality of sensing data and a high-precision map through the sensor 110 of the autonomous vehicle and a communication system (not shown), and generates a safe following distance DMIN between the autonomous vehicle and an adjacent vehicle through a responsibility-sensitive safety model (RSS model) according to the plurality of sensing data and the high-precision map. The safe following distance DMIN allows the processor 120 to further determine whether it is necessary to perform auxiliary control on the autonomous vehicle to avoid accidents, and a top view may be displayed through a display device (not shown) on the autonomous vehicle for the driver's reference.

In an embodiment, the sensor 110 may include a camera, LiDAR, radar, an accelerometer, a gyroscope, a weather sensor, a wheel speedometer, a thermometer, etc., and the number and type thereof is not limited. The processor 120 includes, for example, a central processing unit (CPU), a microprocessor, a digital signal processor (DSP), a programmable controller, a programmable logic device (PLD), or other similar devices, or a combination of these devices, and is not limited thereto.

In step S210, the sensor 110 senses an adjacent vehicle to generate first sensing data S1, and senses the autonomous vehicle to generate second sensing data S2, and the adjacent vehicle is adjacent to the autonomous vehicle. The first sensing data S1 includes but is not limited to include a longitudinal velocity $V_f$, a lateral velocity, image data, and LiDAR data of the adjacent vehicle, and the second sensing data S2 includes but is not limited to include a longitudinal velocity $V_r$, a lateral velocity, a wheel velocity, a wheel deflection angle, and a yaw rate of the autonomous vehicle and a pavement inclination angle degree.

In step S220, pavement material data PM is generated through the processor 120 looking up the high-precision map or the sensor 110 sensing the pavement, and a first friction coefficient μ1 between the adjacent vehicle and the pavement is estimated according to the pavement material data PM. The high-precision map has a very high accuracy of centimeter level, and includes complex information of the pavement, such as slope, curvature, road boundary, pavement texture, traffic signs, etc. The processor 120 may receive the high-precision map through the communication system/telecommunications network, and look up the high-precision map to generate the pavement material data PM of the pavement where the adjacent vehicle is currently located, for example, asphalt pavement, cement pavement or soil pavement, etc. Next, the local weather is obtained through the communication system/telecommunications network or the temperature outside the car and the material covered on the pavement are sensed by the sensor 110, so as to further update the pavement material data PM, such as asphalt pavement (dry), asphalt pavement (wet), ice surface, snow pavement, etc. On the other hand, it is also possible to sense the pavement by the sensor 110 and compare with the database by the processor 120 to generate the pavement material data PM, and the disclosure is not limited thereto. After the pavement material data PM is generated, the processor 120 may input the pavement material data PM into a lookup table (Table 1) to generate the first friction coefficient μ1 between the adjacent vehicle and the pavement. The lookup table includes the correspondence between the pavement material data PM and the first friction coefficient μ1. It must be noted that the first friction coefficient μ1 is the maximum value of the friction coefficient corresponding to the pavement material data PM. For example, when the pavement material is asphalt pavement (dry), the corresponding maximum friction coefficient is 0.8 to 0.9.

TABLE 1

| Pavement material data PM | First friction coefficient μ1 |
| --- | --- |
| Asphalt pavement (dry) | 0.8 to 0.9 |
| Asphalt pavement (wet) | 0.5 to 0.7 |
| Snow pavement | 0.2 |
| Ice | 0.1 |

In step S230, the processor 120 may estimate a second friction coefficient μ2 and a rolling friction coefficient μr between the autonomous vehicle and the pavement according to the second sensing data S2. In an embodiment, the processor 120 generates the pavement inclination angle and a planned path curve through looking up the high-precision map or the sensor 110 sensing the pavement. Next, the second friction coefficient μ2 between the autonomous vehicle and the pavement is calculated through the longitudinal velocity $V_r$, the wheel velocity, the wheel deflection angle, the yaw rate, the pavement inclination angle, and the planned path curve of the autonomous vehicle in the second sensing data. European Patent EP3106360A1 may be referred to for the specific calculation method. After the pavement material data PM is generated, the processor 120 may input the pavement material data PM into the lookup table (Table 2) to generate the rolling friction coefficient μr between the autonomous vehicle and the pavement. The lookup table includes the correspondence between the pavement material PM and rolling friction coefficient μr.

TABLE 2

| Pavement material data PM | Rolling friction coefficient μr |
| --- | --- |
| Good asphalt pavement | 0.0068 |
| Inferior asphalt pavement | 0.0127 |
| Sand pavement | 0.250 |

Next, in step S240, the processor 120 calculates the safe following distance DMIN between the autonomous vehicle and the adjacent vehicle according to the first sensing data S1, the second sensing data S2, the first friction coefficient μ1, the second friction coefficient μ2, and the rolling friction coefficient μr. The details of calculating the safe following distance DMIN will be explained in detail in FIG. 3.

Figure 3:
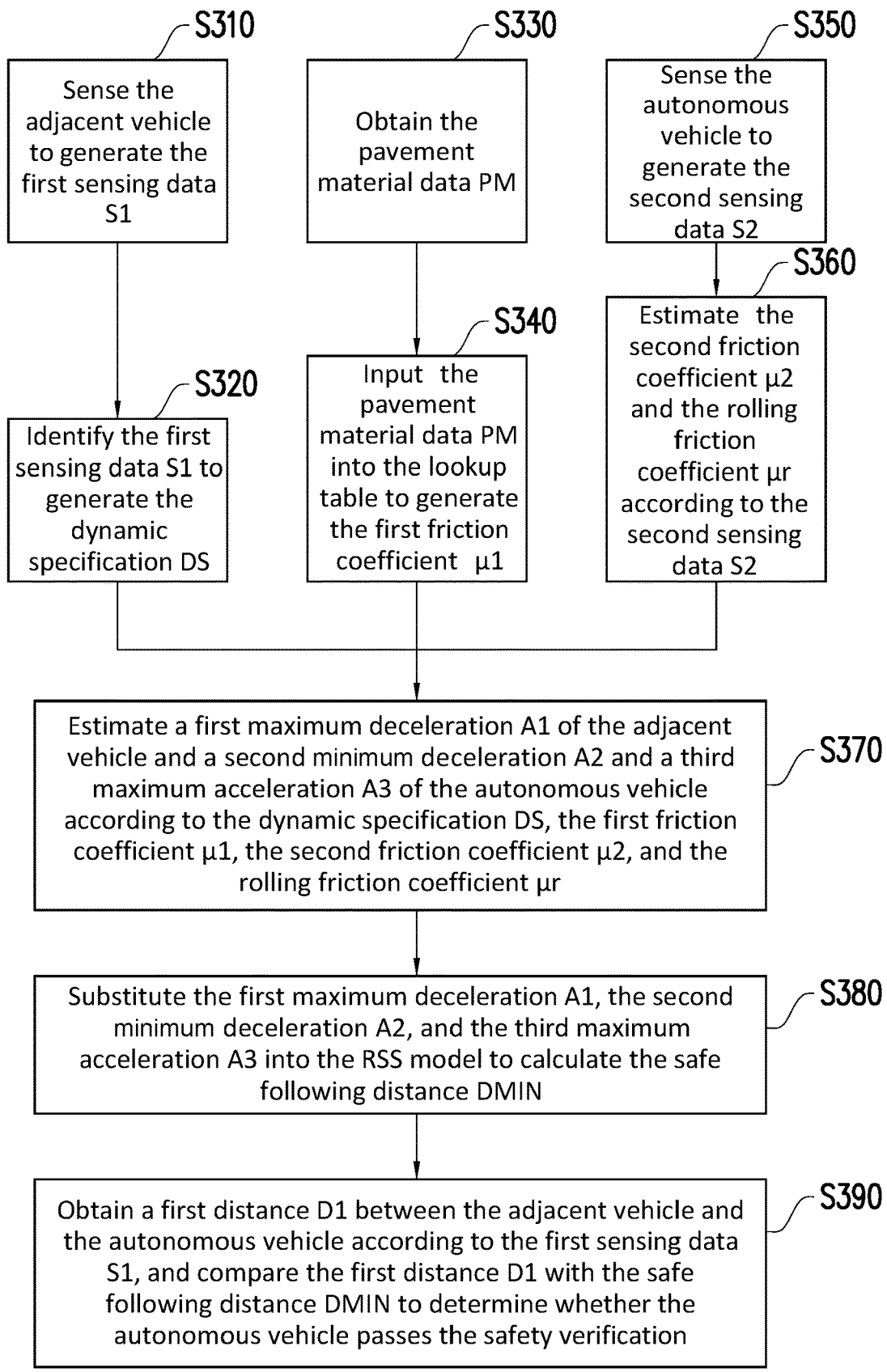
FIG. 3 illustrates a flow chart of calculating a safe following distance and performing a safety verification according to an embodiment of the disclosure.

FIG. 3 illustrates a flow chart of calculating a safe following distance and performing a safety verification according to an embodiment of the disclosure. Referring to FIG. 3, in step S310, the sensor 110 senses the adjacent vehicle to generate the first sensing data S1. Next, in step S320, the processor 120 receives the first sensing data S1 and identifies the first sensing data S1 to identify the vehicle model of the adjacent vehicle, and looks up the corresponding dynamic specification DS according to the identified vehicle model. The dynamic specification DS at least includes the maximum deceleration in the adjacent vehicle specification, that is, the maximum braking deceleration of the adjacent vehicle. It is worth mentioning that since the adjacent vehicle adjacent to the autonomous vehicle may continuously change in the driving process, the first sensing data sensed by the sensor 110 also change. Therefore, the dynamic specification dynamically changes accordingly. The details of identification in step S320 will be explained in detail in FIG. 4.

In step S330, the processor 120 obtains the pavement material data PM. Specifically, the pavement material data PM may be obtained through the processor 120 looking up the high-precision map or the sensor 110 sensing the pavement, and the disclosure is not limited thereto. Next, in step S340, the processor 120 inputs the pavement material data PM into the lookup table (see Table 1) to generate the first friction coefficient μ1 between the adjacent vehicle and the pavement.

In step S350, the sensor 110 senses the autonomous vehicle to generate the second sensing data S2. Next, in step S360, the processor 120 receives the second sensing data S2, and estimates the second friction coefficient μ2 and the rolling friction coefficient μr according to the second sensing data S2. In an embodiment, the processor 120 calculates the second friction coefficient μ2 between the autonomous vehicle and the pavement through the longitudinal velocity Vr, the wheel velocity, the wheel deflection angle, the yaw rate, and the pavement inclination angle of the autonomous vehicle in the second sensing data. The pavement material data PM are entered into the lookup table (see Table 2) to generate the rolling friction coefficient μr between the autonomous vehicle and the pavement. Step S230 may be referred to for details, which will not be repeated herein.

In step S370, the processor 120 estimates a first maximum deceleration A1 of the adjacent vehicle and a second minimum deceleration A2 and a third maximum acceleration A3 of the autonomous vehicle according to the dynamic specification DS, the first friction coefficient μ1, the second friction coefficient μ2, and the rolling friction coefficient μr. In an embodiment, the processor 120 may substitute the maximum deceleration of the adjacent vehicle in the dynamic specification DS and the first friction coefficient μ1 between the adjacent vehicle and the pavement into the lookup table (Table 3) to estimate the first maximum deceleration A1 of the adjacent vehicle. The first maximum deceleration A1 is the maximum deceleration of the adjacent vehicle after the first friction coefficient μ1 is considered. For example, after the adjacent vehicle driving on a snow pavement is identified, the maximum deceleration of the adjacent vehicle, 7.5 m/s$^2$, may be generated. The first friction coefficient μ1 corresponding to the snow pavement is 0.2. After the maximum deceleration of the adjacent vehicle and the first friction coefficient μ1 are substituted into the look-up table, it may be shown that the corresponding first maximum deceleration A1 is 1.67 m/s$^2$. Table 3 is only for illustration, and the disclosure is not limited thereto. It is worth mentioning that, compared with the maximum deceleration of the adjacent vehicle in the dynamic specification DS, the first maximum deceleration A1 further includes the influence of the pavement friction coefficient on the braking performance of the adjacent vehicle.

TABLE 3

| Maximum deceleration of adjacent vehicle | First friction coefficient μ1 | First maximum deceleration A1 of adjacent vehicle |
|---|---|---|
| 7.5 m/s$^2$ | 0.2 | 1.67 m/s$^2$ |
| 8 m/s$^2$ | 0.8 | 7.1 m/s$^2$ |
| 8.5 m/s$^2$ | 0.6 | 5.7 m/s$^2$ |

In an embodiment, the processor 120 may estimate the second minimum deceleration A2 of the autonomous vehicle according to the second friction coefficient μ2, and estimate the third maximum acceleration A3 according to the rolling friction coefficient μr. Specifically, the maximum acceleration and the minimum deceleration in the autonomous vehicle specification are known fixed values, and the processor 120 may respectively substitute the second friction coefficient μ2 and the rolling friction coefficient μr into the lookup tables (Table 4 and Table 5) to generate the second minimum deceleration A2 corresponding to the second friction coefficient μ2 and the third maximum acceleration A3 corresponding to the rolling friction coefficient μr of the autonomous vehicle. The second minimum deceleration A2 is the minimum deceleration of the autonomous vehicle after the second friction coefficient μ2 is considered, and the third maximum acceleration A3 is the maximum acceleration of the autonomous vehicle after the rolling friction coefficient μr is considered. Regarding the second minimum deceleration A2, for example, assuming that the second friction coefficient μ2 of the autonomous vehicle is 0.2, the second minimum deceleration A2 of the autonomous vehicle may be obtained as 0.89 m/s$^2$ after checking Table 4. Table 4 is only for illustration, and the disclosure is not limited thereto. Regarding the third maximum acceleration A3, the processor 120 may input the pavement material data PM into the lookup table (Table 2) of the pavement material data PM and the rolling friction coefficient μr, so as to derive the rolling friction coefficient μr corresponding to the pavement material data PM. The rolling friction coefficient μr specifically refers to the friction coefficient between the autonomous vehicle during acceleration and the pavement. For example, if the autonomous vehicle is driving on a good asphalt pavement, its rolling friction coefficient μr may be 0.0068 after the table is checked. Next, the rolling friction coefficient μr of 0.0068 is substituted into Table 5, and the third maximum acceleration A3 corresponding to the autonomous vehicle may be obtained as 4.98 m/s$^2$, after the table is checked. Table 5 is only for illustration, and the disclosure is not limited thereto. It is worth mentioning that, compared with the minimum deceleration and the maximum acceleration in the autonomous vehicle specification, the second minimum deceleration A2 and the third maximum acceleration A3 further include the influence of the pavement friction coefficient and the rolling friction coefficient on the braking and acceleration performance of the autonomous vehicle.

TABLE 4

| Second friction coefficient μ2 | Second minimum deceleration A2 |
|---|---|
| 0.2 | 0.89 m/s$^2$ |
| 0.8 | 3.56 m/s$^2$ |
| 0.6 | 2.67 m/s$^2$ |

TABLE 5

| Rolling friction coefficient μr | Third maximum acceleration A3 |
|---|---|
| 0.0068 | 4.98 m/s² |
| 0.0127 | 4.93 m/s² |
| 0.25 | 2.6 m/s² |

In step S380, the processor 120 substitutes the first sensing data S1, the second sensing data S2, the first maximum deceleration A1, the second minimum deceleration A2, and the third maximum acceleration A3 into the RSS model to calculate the safe following distance DMIN. Formula (1) may be referred to below.

$$DMIN = \max\left\{0, V_r\rho + \frac{1}{2}A3\rho^2 + \frac{(V_r + \rho A3)^2}{2A2} - \frac{V_f^2}{2A1}\right\} \quad (1)$$

In Formula (1), $V_r$ is the longitudinal velocity of the autonomous vehicle, p is the reaction time before starting to brake, $V_f$ is the longitudinal velocity of the adjacent vehicle, the first sensing data S1 includes $V_f$, and the second sensing data S2 includes $V_r$.

In step S390, the processor 120 may obtain a first distance D1 between the adjacent vehicle and the autonomous vehicle according to the first sensing data S1. In an embodiment, LiDAR and radar in the sensor 110 may be used to measure the distance to the adjacent vehicle to derive the first distance D1 between the adjacent vehicle and the autonomous vehicle. The processor 120 may compare the first distance D1 with the safe following distance DMIN to determine whether the autonomous vehicle passes the safety verification. When the first distance D1 is greater than or equal to the safe following distance DMIN, the processor 120 determines that the autonomous vehicle passes the safety verification. When the first distance D1 is less than the safe following distance DMIN, the processor 120 determines that the autonomous vehicle has not passed the safety verification. When the processor 120 determines that the autonomous vehicle has not passed the safety verification, the processor 120 may drive the autonomous vehicle to decelerate appropriately so as to increase the first distance D1 between the adjacent vehicle and the autonomous vehicle until the first distance D1 is greater than the safe following distance DMIN.

Figure 4:
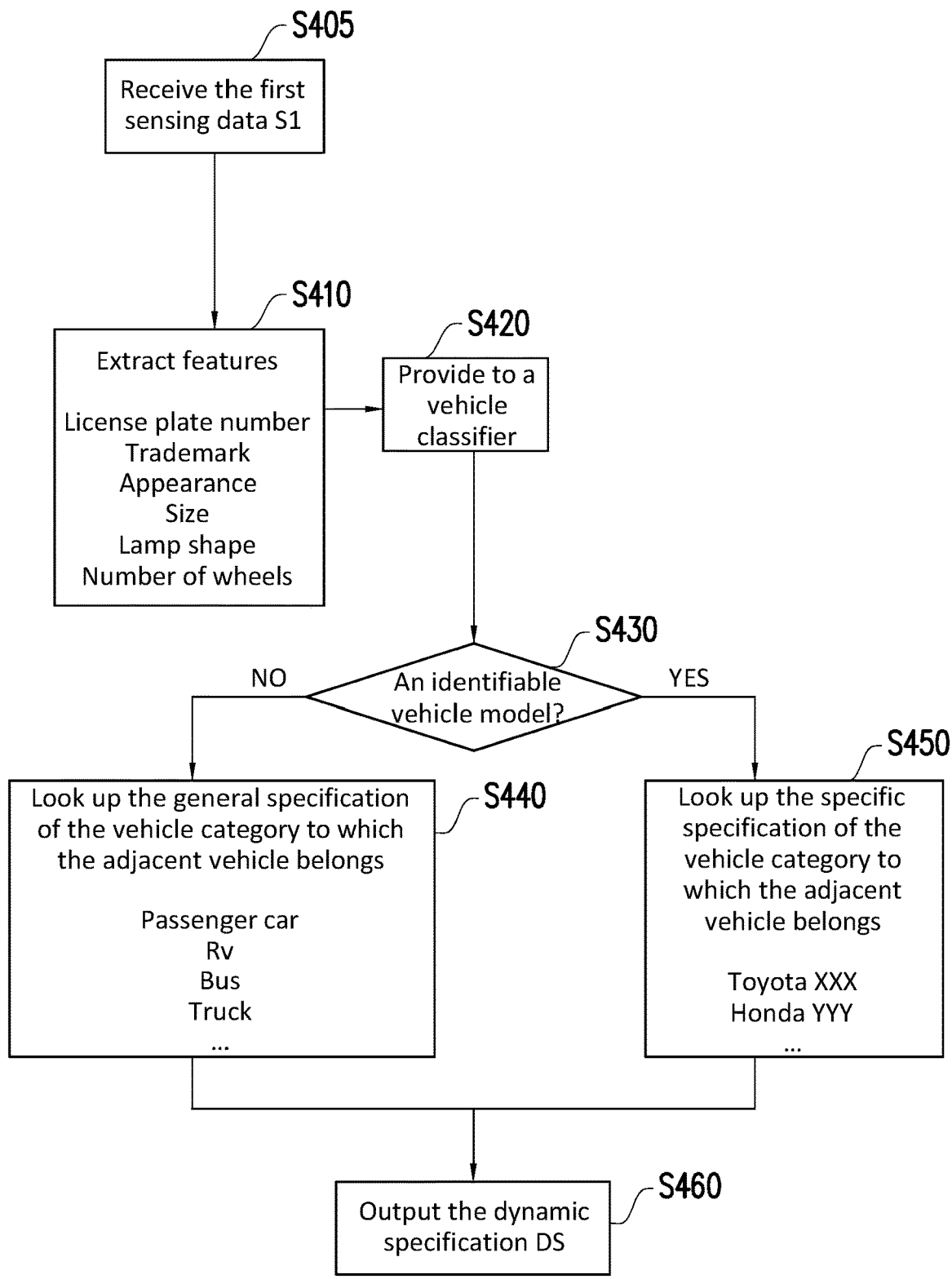
FIG. 4 illustrates a flow chart of generating a dynamic specification according to an embodiment of the disclosure.

FIG. 4 illustrates a flow chart of generating a dynamic specification according to an embodiment of the disclosure. In step S405, the processor 120 receives the first sensing data S1. Next, in step S410, the processor 120 extracts a plurality of features of the adjacent vehicle from the first sensing data S1. The first sensing data S1 includes the image and LiDAR data of the adjacent vehicle, and the processor 120 may extract a plurality of features from the image and LiDAR data of the adjacent vehicle, such as license plate number, trademark, appearance, size, lamp shape, number of wheels, etc., and the disclosure is not limited thereto. In step S420, the processor 120 provides the plurality of features of the adjacent vehicle to a vehicle classifier. In an embodiment, the vehicle classifier includes a modular software that identifies the vehicle category according to the image and LiDAR features, and the vehicle classifier further includes a variety of vehicle specifications. Next, in step S430, the vehicle classifier determines whether the adjacent vehicle is an identifiable vehicle model according to the plurality of features mentioned above. If not, step S440 is proceeded to, and if yes, step S450 is proceeded to.

In step S440, since the vehicle classifier determines that the adjacent vehicle is not an identifiable vehicle model, the vehicle classifier further looks up the general specification of the vehicle category to which the adjacent vehicle belongs, such as the general specification for passenger cars, RVs, buses, and trucks, and the general specification at least includes the maximum deceleration of the adjacent vehicle. In step S450, since the vehicle classifier determines that the adjacent vehicle is an identifiable vehicle model, the vehicle classifier further looks up the specific specification of the vehicle category to which the adjacent vehicle belongs, for example, the specific specification of Toyota XXX or Honda YYY, and the specific specification at least includes the maximum deceleration of the adjacent vehicle. Next, in step S460, according to the general specification or the specific specification that is looked up, the vehicle classifier outputs a dynamic specification that includes the maximum deceleration of the adjacent vehicle.

Figure 5:
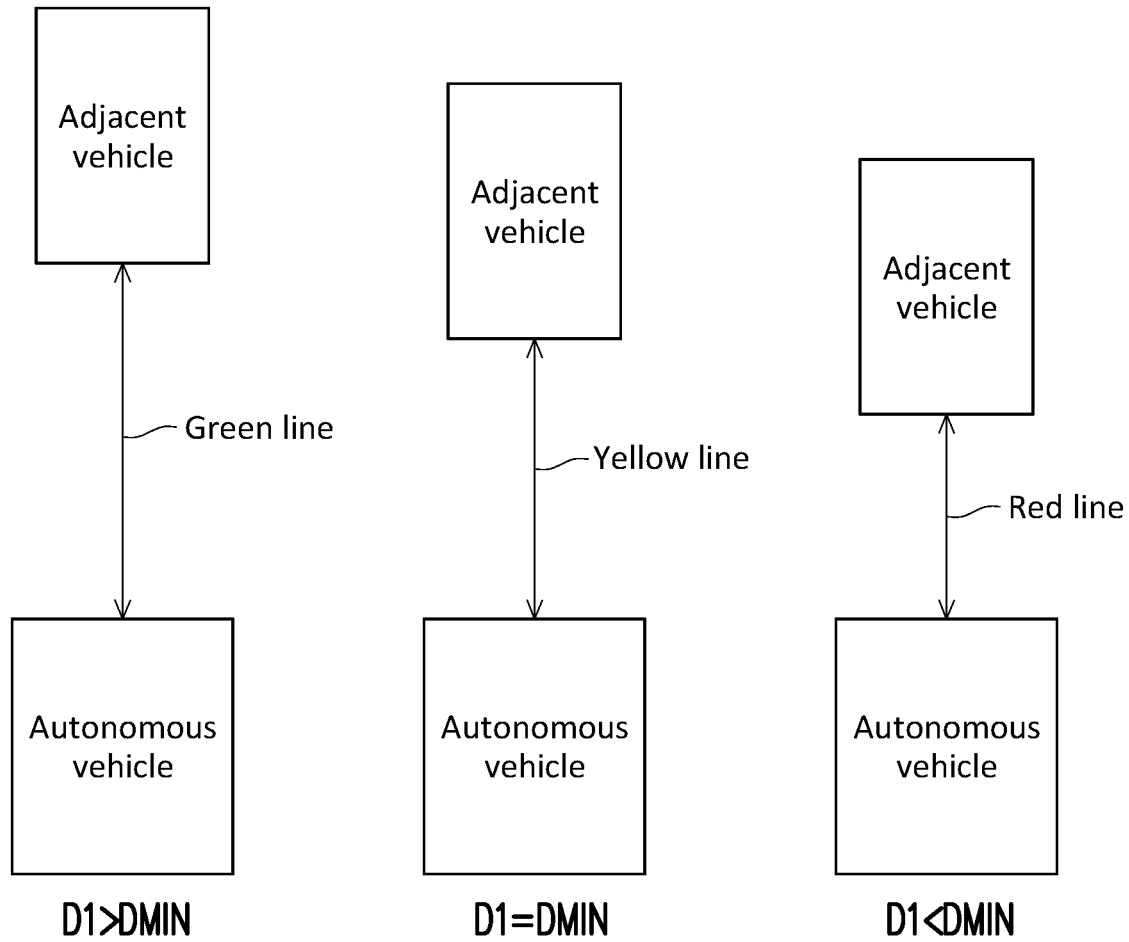
FIG. 5 illustrates a top view of a distance between vehicles according to an embodiment of the disclosure.

FIG. 5 illustrates a top view of a distance between vehicles according to an embodiment of the disclosure. In an embodiment, the safe following distance estimation system 10 further includes a display device. The display device is used to display the top view of a distance between vehicles. The display device may be disposed on a dashboard, a windshield, a rear mirror or a mobile device, but is not limited thereto. Referring to FIG. 5, the display device may provide three display scenarios of the distance between vehicles. Specifically, through the sensor 110 generating the first distance D1 between the autonomous vehicle and the adjacent vehicle, the processor 120 compares the first distance D1 with the safe following distance DMIN. Corresponding to the three comparison results, distance indicator lines (representing the first distance DO between the autonomous vehicles and the adjacent vehicles are displayed in different colors on the display device. For example, when the first distance D1 is greater than the safe following distance DMIN, the distance indicator line between the autonomous vehicle and the adjacent vehicle is displayed as a green line. When the first distance D1 is equal to the safe following distance DMIN, the distance indicator line between the autonomous vehicle and the adjacent vehicle is displayed as a yellow line. When the first distance D1 is less than the safe following distance DMIN, the distance indicator line between the autonomous vehicle and the adjacent vehicle is displayed as a red line. In this way, the driver only needs to quickly determine whether the distance to the adjacent vehicle meets the safe following distance through the color of the distance indicator line, instead of having to identify the text or numbers on the display device in detail, thereby improving user experience.

It must be noted that the adjacent vehicle in this text refers to a vehicle around the autonomous vehicle. The vehicle around the autonomous vehicle may be a vehicle with a longitudinal distance and/or a lateral distance from the autonomous vehicle. That is to say, the vehicle around the autonomous vehicle may be located in the front, diagonally forward, or lateral direction of the autonomous vehicle's travel route, and the number of vehicles around the autonomous vehicle may be more than one, but the disclosure is not limited thereto.

Since the RSS model includes a longitudinal safe following distance and a lateral safe following distance, the autonomous vehicle may consider both the longitudinal safe following distance and the lateral safe following distance. In an embodiment, if the longitudinal distance is the first distance D1, and the lateral distance is the second distance D2, the longitudinal safe following distance is, for example, a longitudinal safe following distance DMIN_V, and the lateral safe following distance is a lateral safe following distance DMIN_S. When the first distance D1 between the autonomous vehicle and the vehicle around the autonomous vehicle is greater than the longitudinal safe following distance DMIN_V and the second distance D2 is greater than the lateral safe following distance DMIN_S, the processor 120 determines that the longitudinal distance and the lateral distance between the autonomous vehicle and the vehicle around the autonomous vehicle have passed the safety verification, and the autonomous vehicle is in a safe state. In another scenario, when the first distance D1 between the autonomous vehicle and the vehicle around the autonomous vehicle is less than the longitudinal safe following distance DMIN_V and the second distance D2 is less than the lateral safe following distance DMIN_S, the processor 120 determines that the longitudinal distance and the lateral distance between the autonomous vehicle and the vehicle around the autonomous vehicle have not passed the safety verification, and the autonomous vehicle might collide with the vehicle around the autonomous vehicle. In another scenario, when the first distance D1 between the autonomous vehicle and the vehicle around the autonomous vehicle is less than the longitudinal safe following distance DMIN_V and the second distance D2 is greater than the lateral safe following distance DMIN_S or when the first distance D1 between the autonomous vehicle and the vehicle around the autonomous vehicle is greater than the longitudinal safe following distance DMIN_V and the second distance D2 is less than the lateral safe following distance DMIN_S, the processor 120 determines that one of the longitudinal distance and the lateral distance between the autonomous vehicle and the vehicle around the autonomous vehicle has not passed the safety verification, and the autonomous vehicle has no immediate risk of colliding with the vehicle around the autonomous vehicle. However, a warning message may be provided to the driver to remind the driver to avoid the situation where neither the longitudinal distance nor the lateral distance between the autonomous vehicle and the vehicle around the autonomous vehicle passes the safety verification.

It must be noted that the friction coefficients in the disclosure, such as the first friction coefficient $\mu 1$, the second friction coefficient $\mu 2$, and the rolling friction coefficient $\mu r$, are just examples. Other friction parameters corresponding to the characteristics of friction may be processed, for example, a first friction parameter, a second friction parameter, and a rolling friction parameter.

In summary, in the disclosure, through identifying the dynamic specification of the adjacent vehicle and estimating the friction coefficients between the wheels of the vehicle around the autonomous vehicle and the autonomous vehicle and the pavement, the real-time estimation accuracy of the maximum acceleration/deceleration between the autonomous vehicle and the vehicle around the autonomous vehicle may be improved, the scenarios where safe following distance can be applied may be increased, and the reliability and safety of autonomous vehicles may be improved. On the other hand, the display device is used to display different scenarios of distances between vehicles relative to the safe following distance in different colors, so as to allow the driver to quickly determine whether the distance between vehicles meets the safe following distance, thereby improving user experience.

Although the disclosure has been disclosed in the above by way of embodiments, the embodiments are not intended to limit the disclosure. Those with ordinary knowledge in the technical field can make various changes and modifications without departing from the spirit and scope of the disclosure. Therefore, the protection scope of the disclosure is subject to the scope of the appended claims.

What is claimed is:

1. A safe following distance estimation system, adapted for an autonomous vehicle, comprising:
  a sensor, sensing at least one of a first longitudinal velocity, a first lateral velocity, image data, and LiDAR data of an adjacent vehicle to generate first sensing data, sensing at least one of a second longitudinal velocity, a second lateral velocity, a wheel velocity, a wheel deflection angle, a yaw rate, and an inclination angle of the autonomous vehicle to generate second sensing data, wherein the adjacent vehicle is adjacent to the autonomous vehicle;
  a processor, coupled to the sensor, receiving the first sensing and the second sensing data from the sensor, calculating a first friction parameter between wheels of the adjacent vehicle and a pavement according to pavement material data, calculating a second friction parameter between wheels of the autonomous vehicle and the pavement according to the second sensing data, calculating a safe following distance between the autonomous vehicle and the adjacent vehicle according to the first sensing data from the sensor, the second sensing data from the sensor, the first friction parameter, and the second friction parameter; and
  a communication system, coupled to the processor, where the processor receives a high-precision map through the communication system, wherein the processor generates the pavement material data according to the high-precision map,
  wherein calculating the safe following distance between the autonomous vehicle and the adjacent vehicle by the processor comprises:
    identifying a dynamic specification of the adjacent vehicle according to the first sensing data, wherein the dynamic specification comprises a maximum deceleration of the adjacent vehicle;
    calculating a first maximum deceleration of the adjacent vehicle according to the dynamic specification and the first friction parameter of the adjacent vehicle,
    calculating a second minimum deceleration of the autonomous vehicle according to the second friction parameter of the autonomous vehicle,
    calculating a third maximum acceleration of the autonomous vehicle according to a rolling friction parameter of the autonomous vehicle; and
    calculating the safe following distance according to the first maximum deceleration, the second minimum deceleration, and the third maximum acceleration.

2. The safe following distance estimation system according to claim 1, wherein the pavement material data are input to a lookup table to generate a first friction coefficient corresponding to the first friction parameter, and the lookup table comprises a correspondence between a pavement material and the first friction coefficient.

3. The safe following distance estimation system according to claim 1, wherein the processor extracts a plurality of features of the adjacent vehicle from the first sensing data, and provides the plurality of features to a vehicle classifier to generate the dynamic specification.

4. The safe following distance estimation system according to claim 1, further comprising:

a display device, used to display a top view, wherein the top view comprises the autonomous vehicle, the adjacent vehicle, and a first distance between the autonomous vehicle and the adjacent vehicle.

5. The safe following distance estimation system according to claim 4, wherein the processor compares the first distance with the safe following distance, and the top view shows the first distance in different colors corresponding to different comparison results.

6. The safe following distance estimation system according to claim 4, wherein the processor compares the first distance with the safe following distance to determine whether the autonomous vehicle passes a safety verification, wherein the safe following distance comprises a longitudinal distance and a lateral distance.

7. A safe following distance estimation method, adapted for an autonomous vehicle, comprising:
sensing, by a sensor, at least one of a first longitudinal velocity, a first lateral velocity, image data, and LiDAR data of an adjacent vehicle to generate first sensing data, and sensing, by the sensor, at least one of a second longitudinal velocity, a second lateral velocity, a wheel velocity, a wheel deflection angle, a yaw rate, and an inclination angle of the autonomous vehicle to generate second sensing data, wherein the adjacent vehicle is adjacent to the autonomous vehicle;
calculating, by a processor, a first friction parameter between wheels of the adjacent vehicle and a pavement according to pavement material data;
calculating, by a processor, a second friction parameter between wheels of the autonomous vehicle and the pavement according to the second sensing data;
calculating, by the processor, a safe following distance between the autonomous vehicle and the adjacent vehicle according to the first sensing data from the sensor, the second sensing data from the sensor, the first friction parameter, and the second friction parameter;
receiving, by the processor, a high-precision map through a communication system; and
generating, by the processor, the pavement material data according to the high-precision map,
wherein calculating the safe following distance between the autonomous vehicle and the adjacent vehicle according to the first sensing data, the second sensing data, the first friction parameter, and the second friction parameter comprises:
identifying a dynamic specification of the adjacent vehicle according to the first sensing data, wherein the dynamic specification comprises a maximum deceleration of the adjacent vehicle;
calculating a first maximum deceleration of the adjacent vehicle according to the dynamic specification and the first friction parameter of the adjacent vehicle;
calculating a second minimum deceleration of the autonomous vehicle according to the second friction parameter of the autonomous vehicle;
calculating a third maximum acceleration of the autonomous vehicle according to a rolling friction parameter of the autonomous vehicle; and
calculating the safe following distance according to the first maximum deceleration, the second minimum deceleration, and the third maximum acceleration.

8. The safe following distance estimation method according to claim 7, wherein the pavement material data are input to a lookup table to generate a first friction coefficient corresponding to the first friction parameter, and the lookup table comprises a correspondence between a pavement material and the first friction coefficient.

9. The safe following distance estimation method according to claim 7, wherein identifying the dynamic specification of the adjacent vehicle according to the first sensing data comprises:
extracting a plurality of features of the adjacent vehicle from the first sensing data, and providing the plurality of features to a vehicle classifier to generate the dynamic specification.

10. The safe following distance estimation method according to claim 7, further comprising:
displaying a top view, wherein the top view comprises the autonomous vehicle, the adjacent vehicle, and a first distance between the autonomous vehicle and the adjacent vehicle.

11. The safe following distance estimation method according to claim 10, further comprising:
comparing the first distance with the safe following distance, wherein the top view shows the first distance in different colors corresponding to different comparison results.

12. The safe following distance estimation method according to claim 10, further comprising:
comparing the first distance with the safe following distance to determine whether the autonomous vehicle passes a safety verification, wherein the safe following distance comprises a longitudinal distance and a lateral distance.

* * * * *